(12) United States Patent
Tomiyama

(10) Patent No.: US 7,360,633 B2
(45) Date of Patent: Apr. 22, 2008

(54) LOCKUP DEVICE OF HYDRAULIC TORQUE TRANSMISSION DEVICE

(75) Inventor: Naoki Tomiyama, Hirakata (JP)

(73) Assignee: Exedy Corporation, Osaka (JP)

( * ) Notice: Subject to any disclaimer, the term of this patent is extended or adjusted under 35 U.S.C. 154(b) by 255 days.

(21) Appl. No.: 11/222,758

(22) Filed: Sep. 12, 2005

(65) Prior Publication Data

US 2006/0243551 A1    Nov. 2, 2006

(30) Foreign Application Priority Data

Oct. 27, 2004   (JP) .............................. 2004-312523
Nov. 15, 2004   (JP) .............................. 2004-330957

(51) Int. Cl.
*F16H 45/02* (2006.01)

(52) U.S. Cl. ............... 192/3.29; 192/70.18; 192/70.28; 192/200

(58) Field of Classification Search ..................... None
See application file for complete search history.

(56) References Cited

U.S. PATENT DOCUMENTS 4,785,924 A    11/1988   Jäckel 4,821,855 A    4/1989   Jäckel
5,337,867 A  * 8/1994   Kirkwood ................... 192/3.29
5,918,713 A  * 7/1999   Shimizu et al. ............ 192/3.29

FOREIGN PATENT DOCUMENTS

JP        57051056 A  *  3/1982
JP        63-72968 A      4/1988

* cited by examiner

*Primary Examiner*—Richard M Lorence
(74) *Attorney, Agent, or Firm*—Global IP Counselors, LLP

(57) ABSTRACT

A lockup device 5 includes a damper mechanism 7, a plate 56, a plate 57, a piston 51, and a plate 59. The damper mechanism 7 has a plate 52 rotating together with the turbine 10, and plates 53 and 54 rotatable with respect to the plate 52. The plate 56 is unrotatable and axially movable with respect to the plates 53 and 54. The plate 57 is unrotatable and axially movable with respect to the front cover 2, and is arranged on the turbine side of the plate 52. The piston 51 is arranged on the turbine side of the plate 56, and is elastically and unrotatably coupled in an axial direction to the plates 53 and 54 through the plate 59.

16 Claims, 4 Drawing Sheets

LOCKUP DEVICE OF HYDRAULIC TORQUE TRANSMISSION DEVICE

CROSS-REFERENCE TO RELATED APPLICATIONS

This application claims priority to Japanese Patent Application Nos. 2004-312523 and 2004-330957. The entire disclosures of Japanese Patent Application Nos. 2004-312523 and 2004-330957 are hereby incorporated by reference.

BACKGROUND OF THE INVENTION

1. Field of the Invention

The present invention relates to a lockup device of a hydraulic torque transmission device. Specifically, the present invention relates to a lockup device of a hydraulic torque transmission device including a front cover supplied with a torque, an impeller, which is fixed to the front cover to form a fluid chamber filled with working fluid, and a turbine opposed to the impeller. More specifically, the invention relates to the lockup device, which is arranged between the front cover and the turbine to couple mechanically the front cover and the turbine together.

2. Background Information

A torque converter is a kind of hydraulic torque transmission device. The torque converter is internally provided with three kinds of vane wheels (impeller, turbine, and stator), and is configured to transmit a torque by circulation of working fluid kept therein. The impeller is fixed to a front cover coupled to an input rotary member (i.e., rotary member on an input side). When the impeller rotates, the working fluid flows from the impeller toward the turbine to rotate the turbine. Thereby, the turbine provides torque to an input shaft. This kind of torque converter is often provided with a lockup device.

The lockup device is arranged between the turbine and the front cover, and is configured to couple mechanically the front cover to the turbine to transmit directly transmitting the torque therebetween. Japanese Laid-Open Patent Publication NO. S63-72968 discloses a lockup device structure having three friction surfaces. Japanese Laid-Open Patent Publication No. S63-72968 is hereby incorporated by reference.

The lockup device having three friction surfaces primarily includes a damper mechanism, first and second friction plates, and a piston. The damper mechanism has a hub flange that rotates together with a turbine, retaining and clutch plates, which are rotatable with respect to the hub flange, and torsion springs that elastically couple the hub flange to the retaining and clutch plates in a rotating direction. The torsion springs are held by the retaining and clutch plates. The first friction plate is unrotatably and axially movably engaged with the retaining and clutch plates. The second friction plate is unrotatably and axially movably engaged with a radially outermost portion of the front cover. The piston is fixed to the retaining and clutch plates by rivets. The piston is axially and closely arranged on and to a turbine side of the second friction plate. Further, the piston can be moved axially together with the damper mechanism by changes in pressure of the working fluid.

In this lockup device, when the working fluid is discharged from a space on an front cover side (i.e., a side axially opposed to the front cover) of the piston, hydraulic pressure in a space on a turbine side (i.e., a side axially opposed to the turbine) of the piston becomes higher than that in the space on the front cover side so that the piston moves axially toward the front cover. Thereby, the piston pushes the second friction plate, which in turn pushes the first friction plate so that the first friction plate is pressed against the friction surface of the front cover, and frictional coupling is achieved. Therefore, the torque of the front cover is transmitted from the friction surface and the second friction plate through the first friction plate and the piston to the retaining and clutch plates, and further the torque is transmitted to the hub flange through the torsion springs, and is output to the turbine. This arrangement will be referred to as "lockup ON."

In the lockup ON state, when the working fluid is supplied into the space on the front cover side of the piston, the pressure in the space on the front cover side of the piston increases to move the piston axially toward the turbine. Thereby, the piston no longer presses the second friction plate axially against the front cover, and the first friction plate is no longer pressed against the friction surface of the front cover so that the frictional coupling is released. Therefore, the torque of the front cover is not transmitted from the friction surface and the second friction plate through the first friction plate and the piston to the retaining and clutch plates, but is transmitted from the impeller to the turbine by driving fluid. This will be referred to as "lockup OFF."

In the above lockup device having the three friction surfaces, the piston is moved axially by the changes in hydraulic pressure. Therefore, a situation may occur such that the pressure in the space on the front cover side of the piston becomes higher than the pressure in the space on the turbine side of the piston, and the piston is axially pulled toward the turbine, as is done in the case when the torque converter is reversely driven. In the above case, when an operation is performed to attain the lockup ON state, the piston cannot rapidly move axially toward the front cover, resulting in low response property problems. In the operation of attaining the lockup OFF state, the piston to be moved axially toward the turbine is in such a state the pressure in the space on the turbine side of the piston is higher than that in the space on the front cover side of the piston. This likewise results in low response property problems.

Further, in the conventional lockup device having the three friction surfaces, the second friction plate is axially movable so that a clearance cannot be ensured between a pushing portion of the piston and the second friction plate in the lockup OFF state. Thus drag torque problems are liable to occur.

In view of the above, it will be apparent to those skilled in the art from this disclosure that there exists a need for an improved lockup device of a hydraulic torque transmission device. This invention addresses this need in the art as well as other needs, which will become apparent to those skilled in the art from this disclosure.

SUMMARY OF THE INVENTION

An object of the present invention is to provide a lockup device having three friction surfaces, and particularly a lockup device that can improve lockup response properties, and can reduce a drag torque between a piston and a friction plate in the lockup OFF state.

A lockup device of a hydraulic torque transmission device according to a first aspect of the present invention is arranged in the hydraulic torque transmission device including a front cover supplied with a torque, an impeller fixed to the front cover and forming a fluid chamber filled with working fluid, and a turbine opposed to the impeller. The lockup device is located in a space between the front cover and the turbine to couple mechanically the front cover and the turbine together. The lockup device includes a damper mechanism, a first friction plate, a second friction plate, and a coupling member. The damper mechanism has a driven member rotating together with the turbine, a drive member rotatable with respect to the driven member, and an elastic member elastically coupling the driven and drive members together in a rotating direction.

The first friction plate is unrotatable and axially movable with respect to the drive member. The second friction plate is unrotatable and axially movable with respect to the front cover, and is axially and closely arranged to a turbine side of the first friction plate. The piston is rotatable with respect to the turbine, has a pushing portion axially and closely arranged on and to the turbine side of the second friction plate, and can be moved axially by changes in pressure of the working fluid. The coupling member unrotatably, axially, and elastically couples the drive member and the piston together.

When the lockup device of this hydraulic torque transmission device is in the lockup ON state, the piston moves axially toward the front cover so that the piston is pressed against the second friction plate, which in turn is pressed against the first friction plate. In this operation, the first friction plate is axially pushed by the second friction plate toward the front cover, and thereby is pinched between the friction surface of the front cover and the other so that frictional coupling is performed. In the lockup OFF state, the piston axially moves toward the turbine, and no longer axially pushes the second friction plate toward the front cover so that the first friction plate is no longer pressed against the friction surface and others, and the frictional coupling is released.

In the lockup ON state and lockup OFF state described above, since the piston is unrotatably, axially, and elastically coupled to the drive member via the coupling member, a force acts to return the piston to an axial position where the elastic force of the coupling member is released, i.e., where the coupling member attains the free state. In the lockup ON operation, the pressure of the working fluid in the space on the front cover side of the piston is initially higher than the pressure of the working fluid in the space on the turbine side of the piston, and the piston is initially shifted axially toward the turbine. Therefore, it may be difficult to move rapidly and axially toward the front cover. Even in this state, the piston can be rapidly and axially moved toward the front cover by utilizing the elastic force of the coupling member. Further, in the lockup OFF operation, the pressure in the space on the turbine side of the piston is initially higher than the pressure in the space on the front cover side of the piston. Even in this state, the piston can be moved rapidly toward the turbine by utilizing the elastic force of the coupling member. Further, in the lockup OFF state, a clearance can be ensured between an intermediate plate and the pushing portion of the piston.

According to the lockup device, as described above, the piston can be moved axially and rapidly by utilizing the elastic force of the coupling member in the lockup ON/OFF operations so that the lockup response property can be improved. In the lockup OFF state, since a clearance is ensured between the second friction plate and the pushing portion of the piston, it is possible to reduce a drag torque between the friction plate and the piston in the lockup OFF state.

According to a second aspect of the present invention, the lockup device of the hydraulic torque transmission device of the first aspect further has a feature that the drive member has a pair of drive plates respectively arranged on the axially opposite sides of the elastic member, and fixed together by a fixing member. The fixing member is used to couple the coupling member to the drive member.

According to the lockup device of this hydraulic torque transmission device, since the fixing member that couple the paired drive plates together is used to fix the coupling member to the drive member, the fixing of the coupling member does not increase the number of parts.

According to the lockup device of the hydraulic torque transmission device of the present invention, since the piston is unrotatably, axially and elastically coupled to the drive member through the coupling member, the piston can be axially and rapidly moved by utilizing the elastic force of the coupling member in the lockup ON/OFF operations so that the lockup response properties can be improved. Further, in the lockup OFF state, a clearance is ensured between the second friction plate and the pushing portion of the piston, this structure can reduce a drag torque between the friction plate and the piston in the lockup OFF state.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

An embodiment of a lockup device of a hydraulic torque transmission device according to the invention will now be described with reference to drawings.

(1) Overall Structure of a Torque Converter

Figure 1:
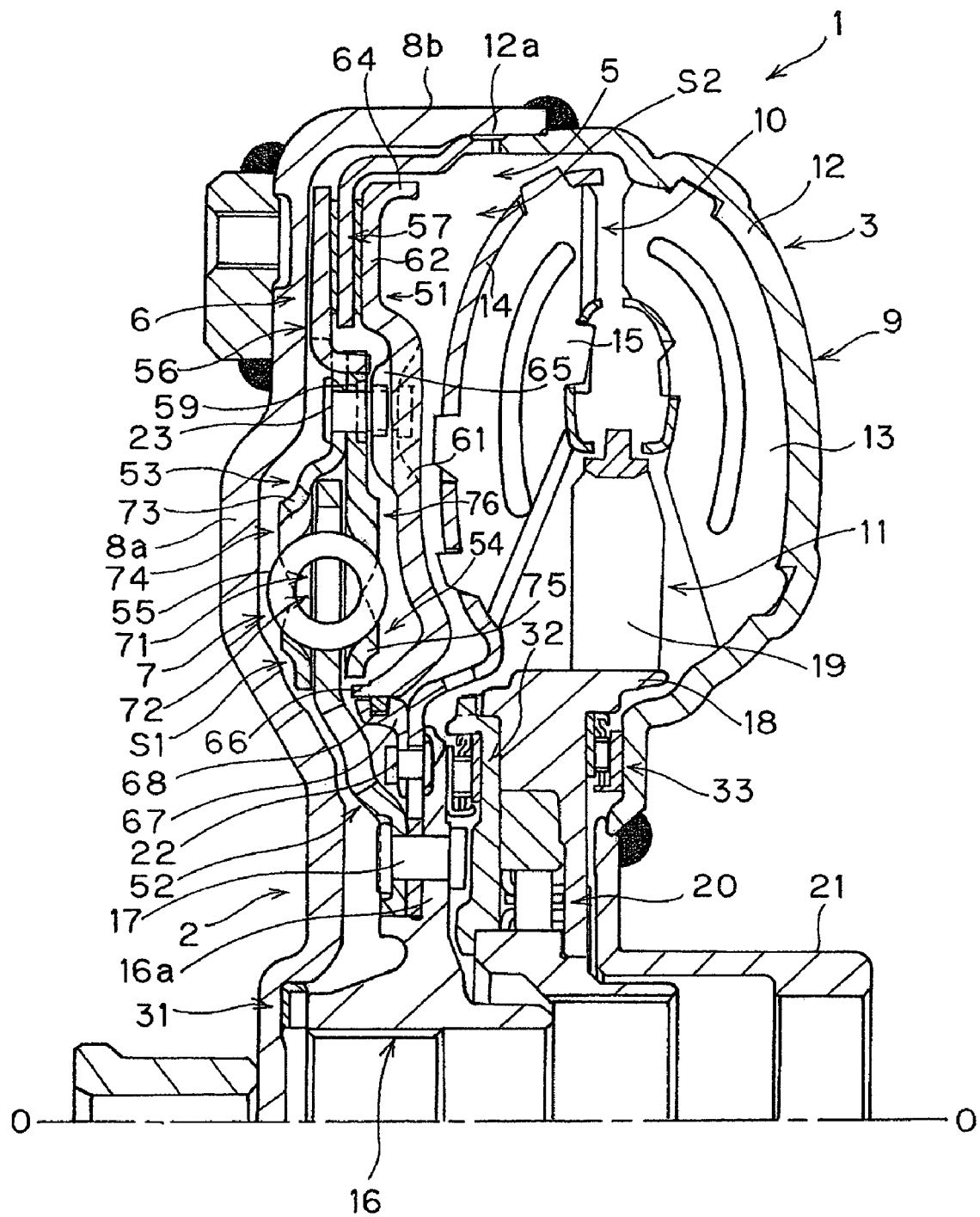
FIG. 1 is a schematic cross-sectional view of a torque converter according to a first preferred embodiment of the present invention having a lockup device of a hydraulic torque transmission device.

FIG. 1 is a schematic cross-sectional view of a torque converter 1 employing a device of the hydraulic torque transmission device according to a first preferred embodiment of the present invention. On the left side in FIG. 1, an engine (not shown) is arranged, and a transmission (not shown) is arranged on the right side. In FIG. 1, O-O indicates a rotation axis of the torque converter 1.

The torque converter 1 is a device provided to transmit a torque from a crankshaft (not shown) of the engine to an input shaft of the transmission. The torque converter 1 is formed of a front cover 2 fixed to a member on the input side, a torque converter body 3 formed of three kinds of vane wheels (an impeller 9, a turbine 10 and a stator 11), and a lockup device 5.

The front cover 2 is a disk-like member, and primarily has a cover disk portion 8a and a radially outer cylindrical portion 8b, which is formed at an outer peripheral portion of the cover disk portion 8a and projects axially toward the transmission side. The outer cylindrical portion 8b is fixed by welding to an impeller shell 12 of the impeller 9.

The impeller 9 is formed of the impeller shell 12, a plurality of impeller blades 13 fixed to the inner side of the impeller shell 12, and a cylindrical impeller hub 21 arranged on the radially inner side of the impeller shell 12.

The turbine 10 is arranged in a fluid chamber, and is opposed to the impeller 9. The turbine 10 is formed of a turbine shell 14, a plurality of turbine blades 15 fixed to the turbine shell 14, and a turbine hub 16 fixed to the radially inner side of the turbine shell 14. The turbine hub 16 has a flange 16a extending radially outward. Further, the radially inner portion of the turbine shell 14 is fixed together with a hub flange 52, which will be described later, to the flange 16a by a plurality of rivets 17. The inner periphery of the turbine hub 16 is preferably spline-engaged with the input shaft of the transmission (not shown).

The stator 11 is arranged between radially inner portions of the impeller 9 and turbine 10 to direct appropriately the working fluid returning from the turbine 10 to the impeller 9. The stator 11 is primarily formed of an annular stator carrier 18 and a plurality of stator blades 19 arranged on the outer peripheral surface thereof. The stator carrier 18 is supported by a fixed shaft (not shown) via a one-way clutch 20. A first thrust bearing 31 is arranged axially between the front cover 2 and the turbine hub 16. A second thrust bearing 32 is arranged between the turbine hub 16 and the stator 11. A third thrust bearing 33 is arranged between the stator 11 and the impeller hub 21. Each of the thrust bearings 31, 32, and 33 is provided with a port allowing radial flow of the working fluid.

(2) Structure of Lockup Device

Figure 2:
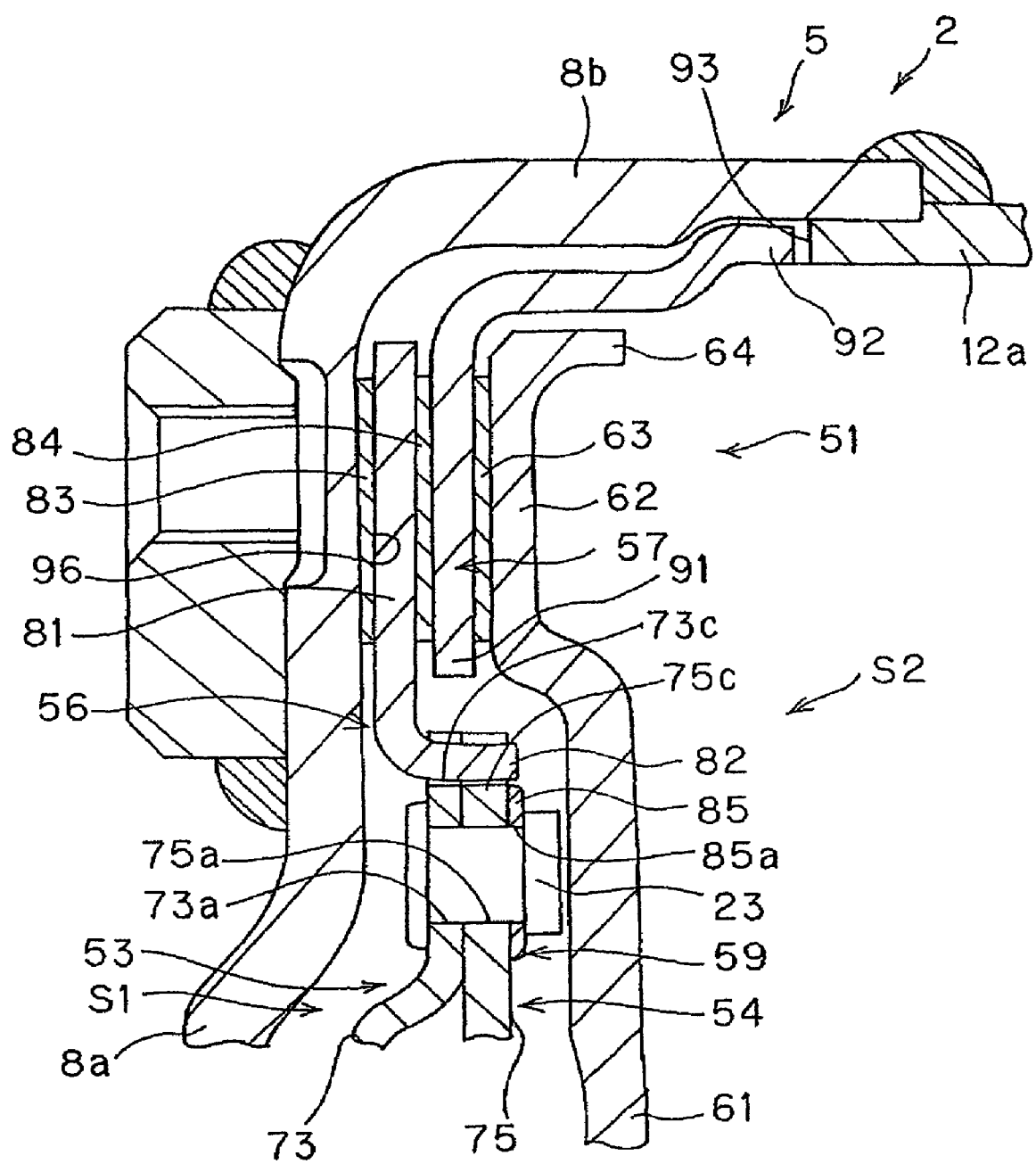
FIG. 2 is a partial cross-sectional view of the lockup device taken along line A-A in FIG. 4.
Figure 3:
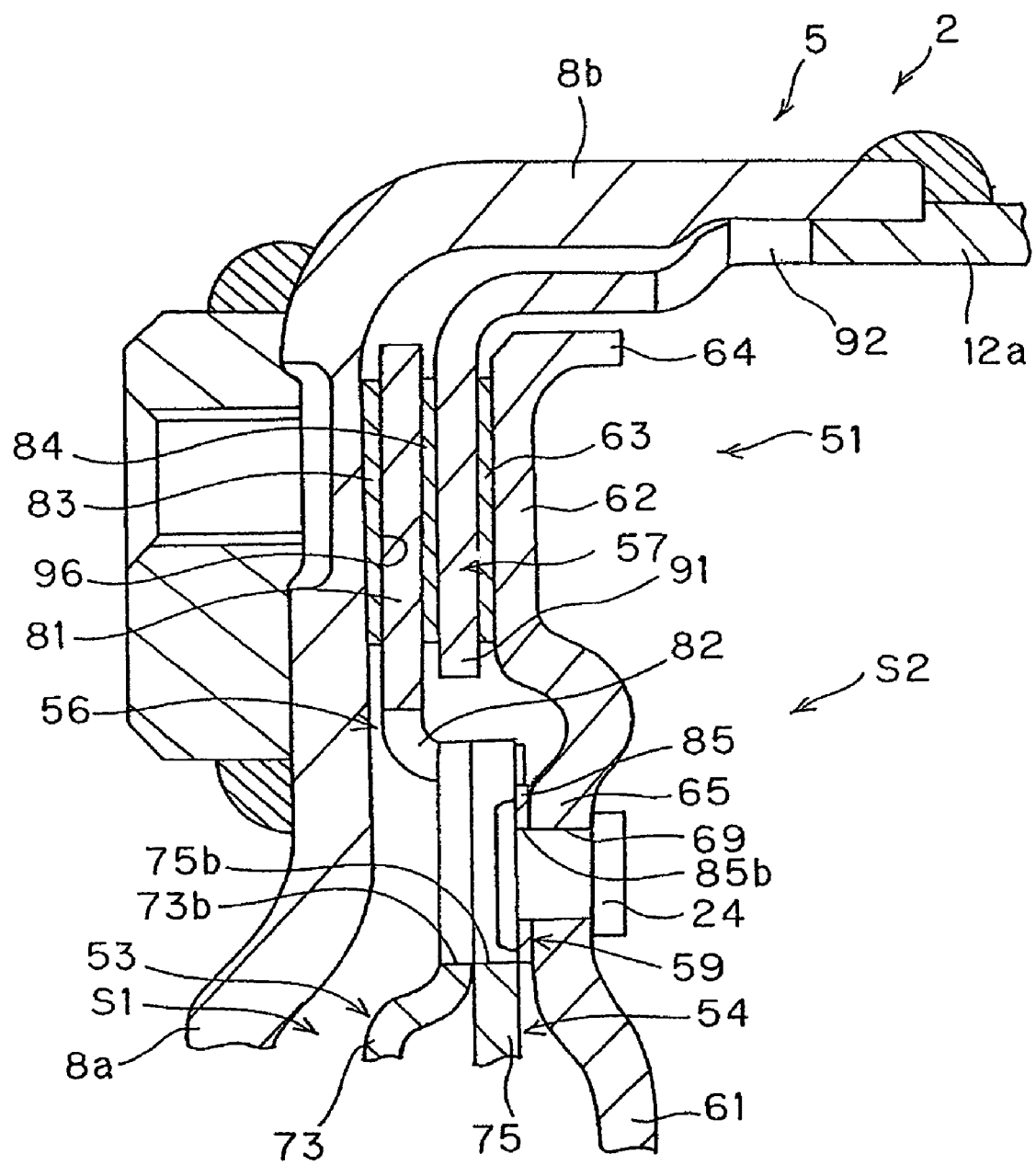
FIG. 3 is a partial cross-sectional view of the lockup device taken along line B-B in FIG. 4.
Figure 4:
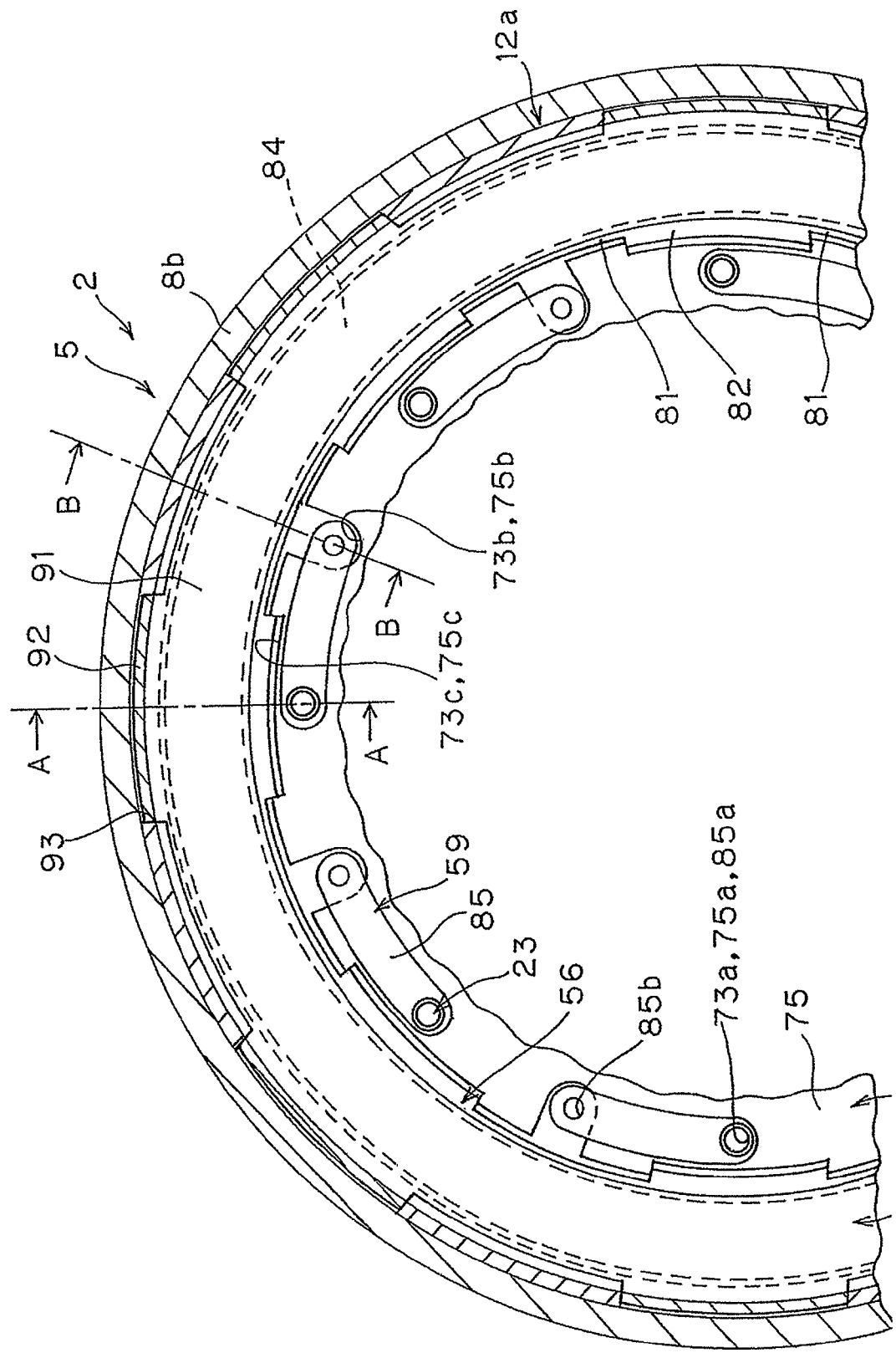
FIG. 4 is a partial plan view of the lockup device viewed from a turbine side with the piston removed.

The lockup device 5 functions to serve as a clutch mechanism 6 engageable with the front cover 2 as well as a function to serve as a damper mechanism 7 elastically coupling the clutch mechanism 6 to the turbine 10 in the rotating direction, and is configured to connect mechanically the front cover 2 to the turbine 10 when necessary. The lockup device 5 is primarily formed of a piston 51, a hub flange 52 serving as a driven member, clutch and retaining plates 53 and 54 serving as drive members, a plurality of torsion springs 55 serving as elastic members, an input plate 56 serving as a first friction plate, an intermediate plate 57 serving as a second friction plate, and a plurality of strap plates 59 serving as coupling members. The lockup device 5 will now be described with reference to FIGS. 1 to 4. FIG. 2 is a schematic cross-sectional view of the lockup device 5 taken along line A-A in FIG. 4. FIG. 3 is a schematic cross-sectional view of the lockup device 5 taken along line B-B in FIG. 4. FIG. 4 is a plan view of the lockup device 5 viewed from the turbine side with the piston 51 removed.

As seen in FIG. 1, the piston 51 is primarily formed of a disk-like piston body 61. The piston body 61 is a disk-like annular member, which extends radially to divide a space between the front cover 2 and the turbine 10 into two portions on the axially opposite sides. The piston body 61 has a radially outer portion forming a pushing portion 62 having an annular flat form. As seen in FIG. 2, a friction facing 63 is arranged on the engine side of the pushing portion 62. A radially outer cylindrical portion 64 is arranged on the outer periphery of the pushing portion 62, and extends axially toward the transmission. Referring to FIG. 3, the piston body 61 is provided at or near its radially middle portion with a plurality of (eight in this embodiment) circumferentially spaced middle projections 65, which are located radially inside the pushing portion 62, and project axially toward the engine. Each middle projection 65 is provided with a plate through-hole 69. As seen in FIG. 1, the piston body 61 is provided at its inner periphery with a radially inner cylindrical portion 66 extending axially toward the engine. The inner peripheral surface of the inner cylindrical portion 66 is supported on an outer peripheral surface of an annular piston support plate 67 fixed to the turbine hub 16, and is movable in both the axial and rotating directions. The piston support plate 67 is fixed to the flange 16a of the turbine hub 16 by a plurality of rivets 22 with the turbine shell 14 arranged axially between them, and is located radially outside the position where the hub flange 52 and the turbine shell 14 are fixed together by the rivets 17. A seal ring 68 is arranged between the inner cylindrical portion 66 and the outer peripheral surface of the piston support plate 67. As seen in FIGS. 1 and 2, owing to the above structure, a space S1 is formed between the front cover 2 and the piston 51. The radially inner portion of the space S1 is in communication with an oil passage from in the input shaft (not shown) via a port formed in the first thrust bearing 31. A space S2 is formed on the turbine side of the piston 51.

The hub flange 52 is primarily formed of a disk-like hub body 71. As described above, the hub body 71 has a radially inner portion fixed to the turbine hub 16, and has an annular form extending radially outward therefrom. The hub body 71 has a plurality of circumferentially extending windows 72. Each window 72 accommodates a torsion spring 55 formed of a coil spring.

The clutch and retaining plates 53 and 54 are respectively formed on the axially opposite sides, i.e., the engine side and transmission side, of the hub flange 52. The clutch plate 53 primarily has a disk-like plate body 73 and windows 74, each of which holds a portion on the engine side of the torsion spring 55, and is in contact with circumferentially opposite ends thereof. The retaining plate 54 primarily has a disk-like plate body 75 and windows 76, each of which holds a portion on the transmission side of the torsion spring 55, and is in contact with the circumferential opposite ends. These windows 74 and 76 are arranged in the positions corresponding to the windows 72, and are configured to compress the torsion springs 55 between the windows 74 and 76 and the windows 72 so that the clutch and retaining plates 53 and 54 are elastically coupled to the hub flange 52 in the rotating direction. The plate bodies 73 and 75 extend radially outward beyond the outer periphery of the hub flange 52. Referring to FIGS. 2, 3, and 4, the plate body 73 is provided at its radially outer portion with a plurality of (eight in this embodiment) circumferentially spaced plate through-holes 73a, a plurality of (eight in this embodiment) plate recesses 73b each arranged circumferentially between the plate through-holes 73a, and a plurality of (eight in this embodiment) plate engaging portions 73c formed at the circumferentially same positions as the plate through-holes 73a. In an elevational view of the clutch plate 53, each plate recess 73b is a U-shaped recess formed at the radially outer portion of the plate body 73. In an elevational view of the clutch plate 53, each plate engaging portion 73c is an arc-shaped recess formed by recessing radially inwardly an outer periphery of only a portion radially outside the plate through-hole 73a. The plate body 75 is provided at its radially outer portion with a plurality of (eight in this embodiment) circumferentially spaced plate through-holes 75a, a plurality of (eight in this embodiment) plate recesses 75b each arranged circumferentially between the plate through-holes 75a, and a plurality of (eight in this embodiment) plate engaging portions 75c formed at the circumferentially same positions as the plate through-holes 75a. In an elevational view of the retaining plate 54, each plate recess 75b is a U-shaped recess formed by recessing radially inwardly an outer periphery of the plate body 75. In an elevational view of the retaining plate 54, each plate engaging portion 75c is an arc-shaped recess formed by recessing radially inwardly an outer periphery of only a portion radially outside the plate through-hole 75a. The plate through-holes 73a and 75a have the same size, and overlap each other in the elevational view. Likewise, the plate recesses 73b and 75b have the same size, and overlap each other in the elevational view, and the plate engagement portions 73c and 75c have the same size, and overlap each other in the elevational view.

The input plate 56 is a disk-like member, and primarily has an annular plate body 81 and a plurality of (eight in this embodiment) claws 82 formed on the inner periphery of the plate body 81 and extending axially toward the transmission. The plate body 81 is an annular flat portion, and respectively carries friction facings 83 and 84 on its axially opposite surfaces. The claws 82 are unrotatably and axially movably engaged with the plate engagement portions 73c and 75c of the plates 53 and 54. The front cover 2 has a friction surface 96 formed on the surface axially opposed to a surface on the engine side of the friction facing 83.

The strap plate 59 is a belt-like member made of an elastically deformable material such as spring steel, and primarily has a plate body 85, a first plate through-hole 85a formed at longitudinally one end of the plate body 85 and a second plate through-hole 85b formed at the longitudinally other end of the plate body 85. The first plate through-hole 85a in each strap plate 59 is arranged corresponding to the plate through-hole 75a in the retaining plate 54 to fix together with the clutch and retaining plates 53 and 54 by a rivet 23. The second plate through-hole 85b in each strap plate 59 is arranged corresponding to the plate through-hole 69 in the piston 51, and each strap plate 59 is fixed to the middle projection 65 of the piston 51 by a rivet 24. As described above, the strap plate 59 unrotatably, axially, and movably couples the clutch and retaining plates 53 and 54 to the piston 51, and is elastic to couple elastically the clutch and retaining plates 53 and 54 to the piston 51. In the elevational view, the portion of each strap plate 59 near the second plate through-hole 85b and the end of each rivet 24 near the retaining plate 54 are smaller in size than the plate recesses 73b and 75b of the clutch and retaining plates 53 and 54. Therefore, when the piston 51 moves axially toward the engine, and thereby the portion of the piston 51 fixed to the middle projection 65 approaches the plate recesses 73b and 75b of the clutch and retaining plates 53 and 54, the end of the rivet 24 and a portion of the strap plate 59 near the second plate through-hole 85b are inserted into the plate recesses 73b and 75b, and thereby are axially and elastically deformed. In this embodiment, the strap plate 59 in the free state is configured to ensure an axial clearance between the pushing portion 62 of the piston 51 and the intermediate plate 57. The torque transmission between the piston 51 and the clutch and retaining plates 53 and 54 can be performed via the strap plates 59.

The intermediate plate 57 primarily has a disk-like plate body 91 arranged axially between the input plate 56 and the pushing portion 62 of the piston 51, and a plurality of (eight in this embodiment) circumferentially spaced claws 92 which extend axially toward the transmission from the outer periphery of the plate body 91. The radially outer cylindrical portion 12a of the impeller shell 12 is provided at an edge on the engine side with a plurality of (eight in this embodiment) axially extending groove-like plate engagement portions 93, and the claws 92 are unrotatably, axially, and movably engaged with the plate engagement portions 93, respectively.

As described above, the lockup device 5 of this embodiment has the clutch mechanism 6 formed of the piston 51, the input plate 56, the intermediate plate 57, and the plurality of strap plates 59, and also has the damper mechanism 7 formed of the hub flange 52, the clutch plate 53, the retaining plate 54 and the plurality of torsion springs 55.

(3) Operation of Torque Converter

An operation of the torque converter 1 will now be described with reference to FIGS. 1 to 4.

Torque of the crankshaft of the engine is preferably supplied to the front cover 2 through a flexible plate (not shown). Thereby, the impeller 9 rotates, and the working fluid flows from the impeller 9 to the turbine 10. This flow of the working fluid rotates the turbine 10, and the torque of the turbine 10 is transmitted to the input shaft (not shown).

When a speed ratio of the torque converter 1 rises to attain a constant rotation speed of the input shaft, the working fluid in the space S1 is drained through an oil passage in the input shaft. Consequently, the pressure in the space S2 on the turbine side of the piston 51 exceeds the pressure in the space S1 on the front cover side, and moves the piston 51 toward the front cover 2. Thereby, the piston 51 pushes the intermediate plate 57, and the intermediate plate 57 moves axially toward the engine to push the input plate 56. Thereby, the input plate 56 moves axially toward the engine to push the friction surface 96 of the front cover 2 so that frictional coupling is performed. Therefore, the torque of the front cover 2 is transmitted from the input plate 56 and the piston 51 through the friction surface 96 and the intermediate plate 57 to the retaining and clutch plates 54 and 53, and is further transmitted through the torsion springs 55 to the hub flange 52. The torque thus transmitted is output to the turbine 10. The torque transmission between the piston 51 and the retaining and clutch plates 54 and 53 is performed through the plurality of strap plates 59. This is referred to as the lockup ON.

The portion of each strap plate 59 fixed to the middle projection 65 of the piston 51 moves toward the plate recesses 73b and 75b of the clutch and retaining plates 53 and 54, and the end of the rivet 24 and the portion of the strap plate 59 near the second plate through-hole 85b are partially inserted into the plate recesses 73b and 75b, and thereby are deformed axially and elastically.

When the working fluid is supplied into the space S1 on the front cover side of the piston 51 in the lockup ON state, the pressure in the space S1 on the front cover side of the piston 51 rises to move axially the piston 51 toward the turbine. Thereby, the piston 51 no longer axially pushes the intermediate plate 57 toward the front cover 2, and the input plate 56 no longer pushes the friction surface 96 of the front cover 2 so that the frictional coupling is released. Therefore, the torque of the front cover 2 is not transmitted via the input plate 56 and the piston 51 as well as the friction surface 96 of the front cover 2 and the intermediate plate 57 to the retaining and clutch plates 54 and 53. Alternatively, the torque is output from the impeller 9 to the turbine 10 by hydraulic driving. This is referred to as the lockup OFF.

In the lockup device 5 of this embodiment, the elastic force of the strap plates 59 returns the piston 51 to the initial position corresponding to the free state of the strap plates 59.

(4) Features of the Torque Converter

The torque converter 1 of the embodiment and particularly the lockup device 5 has the following features.

(A) In the lockup device 5 of the embodiment, since the retaining and clutch plates 54 and 53 are axially and elastically coupled to the piston 51 through the strap plates 59, a force acts to return these parts to the positions where the elastic force of the strap plates 59 is released, i.e., the strap plates 59 attain the free state. In the lockup ON operation, the pressure of the working fluid in the space S1 is initially higher the pressure of the working fluid in the space S2, and the piston 51 is initially shifted axially toward the turbine. Therefore, it may be difficult to move the piston 51 axially and rapidly toward the front cover 2 without the strap plates 59. Even in this state, the piston 51 can be rapidly and axially moved toward the front cover by utilizing the elastic force of the strap plates 59. Further, in the lockup OFF operation, the piston 51 must be initially and axially moved toward the turbine when the pressure in the space S2 is higher than the pressure in the space S1. Even in this state, the piston 51 can be rapidly and axially moved toward the turbine by utilizing the elastic force of the strap plates 59. Further, in the lockup OFF state, a clearance can be ensured between the intermediate plate 57 and the pushing portion 62 of the piston 51.

Thereby, the lockup device 5 can rapidly and axially move the piston 51 by utilizing the elastic force of the strap plates 59, and thereby can improve the response property in the lockup ON operation and the lockup OFF operation. Also, in the lockup OFF state, the clearance can be ensured between the intermediate plate 57 and the pushing portion 62 of the piston 51 to reduce the drag torque between the intermediate plate 57 and the piston 51.

(B) The strap plates 59 are fixed to the retaining and clutch plates 54 and 53 by using the plurality of rivets 23, which are also used to fix the retaining and clutch plates 54 and 53 together. Therefore, the fixing of the strap plates 59 does not increase the number of parts.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A lockup device arranged in a hydraulic torque transmission device having a front cover configured to receive a torque, an impeller fixed to the front cover and forming a fluid chamber filled with working fluid, and a turbine opposed to the impeller, and located in a space between the front cover and the turbine to couple mechanically the front cover and the turbine together, the lockup device comprising:
    a damper mechanism having
        a driven member rotating together with the turbine,
        a drive member being rotatable with respect to said driven member, and
        an elastic member elastically coupling said driven and drive members together in a rotating direction;
    a first friction plate being unrotatable and axially movable with respect to said drive member;
    a second friction plate being unrotatable and axially movable with respect to the front cover, and arranged axially on a turbine side of said first friction plate;
    a piston being rotatable with respect to the turbine, being axially movable relative to the drive member by a predetermined distance, having a pushing portion arranged axially closely to the turbine side of said second friction plate, and being movable axially according to changes in pressure of the working fluid; and
    a coupling member unrotatably and axially elastically coupling said drive member and said piston together.

2. The lockup device of the hydraulic torque transmission device according to claim 1, further comprising
    a first fixing member coupling said coupling member to said drive member, wherein
    said drive member has a pair of drive plates arranged on the axially opposite sides of said driven member, and fixed together by said first fixing member.

3. The lockup device of the hydraulic torque transmission device according to claim 2, further comprising
    a second fixing member coupling said coupling member to said piston, wherein
    said drive member has a recess in which at least a part of said second fixing member is disposed.

4. The lockup device of the hydraulic torque transmission device according to claim 3, wherein
    said first fixing member is disposed at substantially the same radial position as said second fixing member.

5. The lockup device of the hydraulic torque transmission device according to claim 2, wherein
    said first friction plate engages with said pair of drive plates to be unrotatable and axially movable relative thereto.

6. The lockup device of the hydraulic torque transmission device according to claim 1, wherein said first friction plate has an annular first friction plate body being slidable relative to said front cover and second friction plate and a first claw extending from said first friction plate body toward the transmission and engaging with said drive member.

7. The lockup device of the hydraulic torque transmission device according to claim 6, wherein
said second friction plate has an annular second friction plate body being slidable relative to said first friction plate and piston and a second claw extending from said first friction plate body toward the transmission and engaging with said front cover.

8. The lockup device of the hydraulic torque transmission device according to claim 2, wherein
said piston has a piston body and an outer cylindrical portion extending from an outer portion of said piston body toward the transmission.

9. A torque converter comprising:
a front cover;
an impeller being fixed to said front cover;
a turbine being axially arranged between said impeller and said front cover; and
a lockup device being axially arranged between said front cover and said turbine, said lockup device being configured to engage and to disengage a coupling of said front cover and said turbine, said lockup device having
a damper mechanism having
a driven member rotating together with said turbine,
a drive member being rotatable with respect to said driven member, and
an elastic member elastically coupling said driven and drive members
together in a rotating direction,
a first friction plate being unrotatable and axially movable with respect to said drive member,
a second friction plate being unrotatable and axially movable with respect to said front cover, and arranged axially on a turbine side of said first friction plate
a piston being rotatable with respect to said turbine, having a pushing portion arranged axially closely to said turbine side of said second friction plate, being axially movable relative to the drive member by a predetermined distance, and being movable axially according to changes in pressure of working fluid, and
a coupling member unrotatably and axially elastically coupling said drive member and said piston together.

10. The torque converter according to claim 9, further comprising
a first fixing member coupling said coupling member to said drive member, wherein
said drive member has a pair of drive plates arranged on the axially opposite sides of said driven member, and fixed together by said first fixing member.

11. The torque converter according to claim 10, further comprising
a second fixing member coupling said coupling member to said piston, wherein
said drive member has a recess in which at least a part of said second fixing member is disposed.

12. The torque converter according to claim 11, wherein
said first fixing member is disposed at substantially the same radial position as said second fixing member.

13. The torque converter according to claim 10, wherein
said first friction plate engages with said pair of drive plates to be unrotatable and axially movable relative thereto.

14. The torque converter according to claim 9, wherein
said first friction plate has an annular first friction plate body being slidable relative to said front cover and second friction plate and a first claw extending from said first friction plate body toward the transmission and engaging with said drive member.

15. The torque converter according to claim 14, wherein
said second friction plate has an annular second friction plate body being slidable relative to said first friction plate and piston and a second claw extending from said first friction plate body toward the transmission and engaging with said front cover.

16. The torque converter according to claim 10, wherein
said piston has a piston body and an outer cylindrical portion extending from an outer portion of said piston body toward the transmission.

* * * * *